C. R. SHORT.
PULLEY OR THE LIKE.
APPLICATION FILED APR. 6, 1917.
1,330,911.
Patented Feb. 17, 1920.
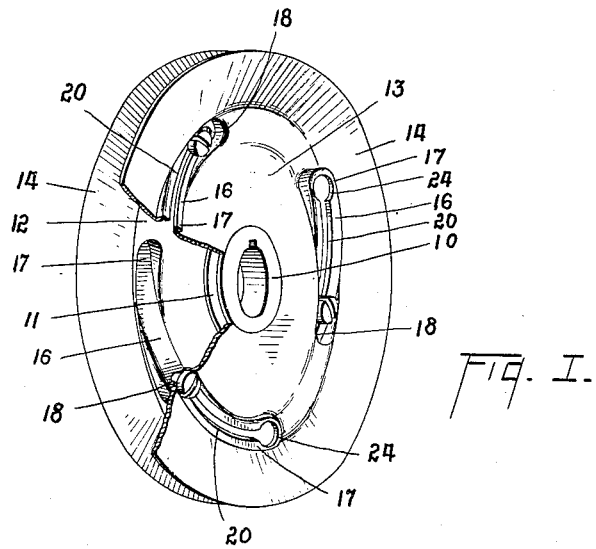
Fig. I.
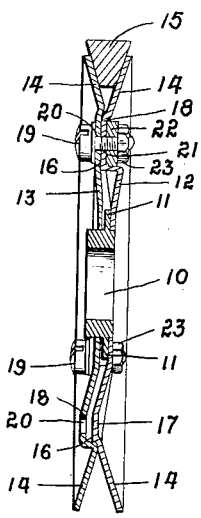
Fig. II.
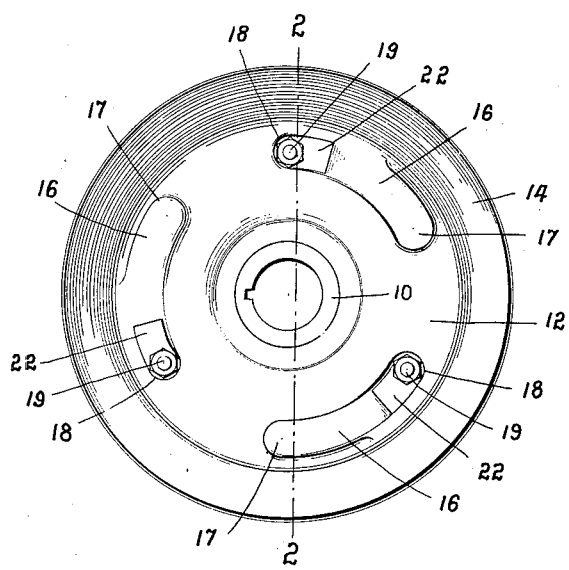
Fig. III.
INVENTOR:
CHARLES R. SHORT,
BY
ATTORNEY.

UNITED STATES PATENT OFFICE.

CHARLES R. SHORT, OF DETROIT, MICHIGAN, ASSIGNOR TO GENERAL MOTORS COMPANY, OF DETROIT, MICHIGAN, A CORPORATION OF NEW JERSEY.

PULLEY OR THE LIKE.

1,330,911.      Specification of Letters Patent.     Patented Feb. 17, 1920.

Application filed April 6, 1917. Serial No. 160,131.

*To all whom it may concern:*

Be it known that I, CHARLES R. SHORT, a subject of the King of Great Britain, and resident of Detroit, Wayne county, State of Michigan, have invented certain new and useful Improvements in Pulleys or the like, of which the following is a specification.

This invention relates to hydrocarbon motors, and particularly to improvements in pulleys therefor.

One of the objects of this invention is to provide an improved pulley having simple and efficient means for adjusting its various parts and the driving band, such as a belt or chain thereon.

Another object of this invention is to provide an improved driving pulley, having a very simply operated cam device for adjusting the relation of various parts of its driving face.

These and various other objects will more clearly appear from the following description, taken in connection with the accompanying drawings, which form a part of this specification, and in which:

Figure 1 illustrates a perspective view, having portions broken away, of a preferred form of my invention;

Fig. 2 is a transverse vertical section substantially on the line 2—2 of Fig. 3; and Fig. 3 is a side elevation of an assembly of a preferred form of my pulley.

Referring to the drawings, 10 illustrates a hub member, having an integral radially extending flange 11. A pair of circular disks in the form of stampings 12 and 13, may be arranged on the hub member 10 at opposite sides of the flanged portion 11. One of these disks as 12 is secured against movement relative to the hub member 10 by spot welding it thereto.

It will be noted that the disks are struck up to form laterally inclined peripheral flanges 14, between which a driving band or belt 15, preferably of V cross section may be arranged.

Means for effecting a relative axial adjustment between the disks 12 and 13, may be provided in the form of inclined cams, or pressed out cam surfaces 16, each having a depression 17 at one end thereof and a raised portion 18 at the opposite end thereof.

To increase the width of the V groove formed between the peripheral flanges 14, the disk which is freely mounted on the hub member 10 is rotated a slight distance relative to the fixed disk, in such a manner as to bring the high or raised portion 18 of a cam surface of one of the disks toward a similar or flat portion of an oppositely disposed cam surface on the other disk, thus causing a spreading or axial wedging action between the two.

When the desired adjustment has been effected, the two disks may be fixed together by tightening screws 19 which pass through slots 20 in the cam faces of the disk 13, and are threaded into correspondingly threaded orifices 21 in the high end of the cam faces of the disk 12, said threaded orifices being reinforced by the pieces 22 spot welded to the cam faces of the disk 12 on the outer side thereof. The screws may be further secured in place by lock nuts 23.

The slots 20 in the cam faces 16 of the disk 13 are enlarged at the low end thereof at 24, whereby if the screw heads are turned to the enlarged openings 24, they will pass through said enlarged openings and permit the disk 13 to be removed for entire removal of the belt.

While I have described and will specifically claim what I deem to be a preferred form of my invention, it will be obvious to those skilled in the art, that various modifications and changes may be made without departing from the spirit and scope hereof.

Having thus described my invention, what I claim and desire to secure by Letters Patent is:

1. A driving pulley comprising plates having flanged, complemental cam surfaces.

2. A pulley comprising a pair of circular disks, one of which is provided with a cam surface, adapted to be arranged adjacent the other disk, said disks being adapted for a relative rotational movement, and adjustable means for securing said disks together.

3. A driving pulley comprising a pair of circular disks, each provided with a laterally extending peripheral flange adapted to form therebetween, a groove of substantially V cross section, one of said disks having a cam surface thereon, and adapted to abut against said other disk, said disks being adapted for relative rotational movement, and means for detachably securing said disks together.

4. A driving pulley comprising a hub member and a pair of sheet metal circular disks, each of which is provided with a struck up axially extending, peripheral flange to form a groove therebetween, one of said disks being formed with a struck up cam surface, one of said disks being secured against rotation relative to said hub member and the other of said disks being adapted for rotational movement relative to the previously mentioned disk, and means for adjustably securing said disks together.

5. A pulley comprising a pair of metal disks, each provided with complementary cam surfaces, said disks being adapted for relative rotational movement whereby said cam surfaces will spread portions of said disks apart, and means for securing said disks against relative rotation.

6. A pulley comprising a pair of circular metallic disks, each provided with a struck up peripheral flange to form a groove therebetween, said disks being provided with complementary circumferentially extending cam surfaces, one of said disks being provided with a perforation, the other of said disks being provided with a slotted portion, said disks being adapted for a relative rotational movement, and a bolt extending through said slotted portion of one disk and the perforation of the other disk, for securing both of them against relative rotation.

7. A pulley comprising a pair of circular metallic disks, each provided with a struck up peripheral flange to form a groove therebetween, said disks being provided with complementary circumferential extending cam surfaces, one of said disks being provided with a slotted portion, said disks being adapted for a relative rotational movement, a bolt extending through said slotted portion of one disk and the perforation of the other disk, and a hub member to which one of said disks is secured.

8. A pulley comprising a pair of circular metallic disks, each provided with cam surfaces and a struck up peripheral flange to form a groove therebetween, one of said disks being provided with a perforation and having a threaded pad secured adjacent thereto, the other disk being provided with a slotted portion, and a bolt adapted to be passed through said slotted portion and cooperating with said threaded portion for securing said disks together.

9. A pulley comprising a pair of circular stampings, each provided with a peripheral flange to form a groove therebetween, said disks being provided with complementary circumferentially extending cam surfaces, one of said disks being provided with a perforation, an interiorly threaded pad secured adjacent thereto, the other disk being provided with a slotted portion and a bolt adapted to extend through said slotted portion and to be adjustably secured to said pad.

10. A pulley comprising a pair of circular stampings, each provided with a struck up peripheral flange to form a groove therebetween, said disks being provided with complementary cam surfaces, one of said disks being provided with a perforation, the other disk being provided with a slotted portion, having an enlarged opening adjacent one end thereof, and a bolt having a head smaller than said enlarged portion and adapted to extend through said slotted portion and said perforation for securing the disks together.

In testimony whereof I affix my signature.

CHARLES R. SHORT.